Dec. 13, 1955 T. MILLER ET AL 2,727,184
SERVO CONTROLLED TRI-COLOR TELEVISION TUBE
Filed Oct. 9, 1952
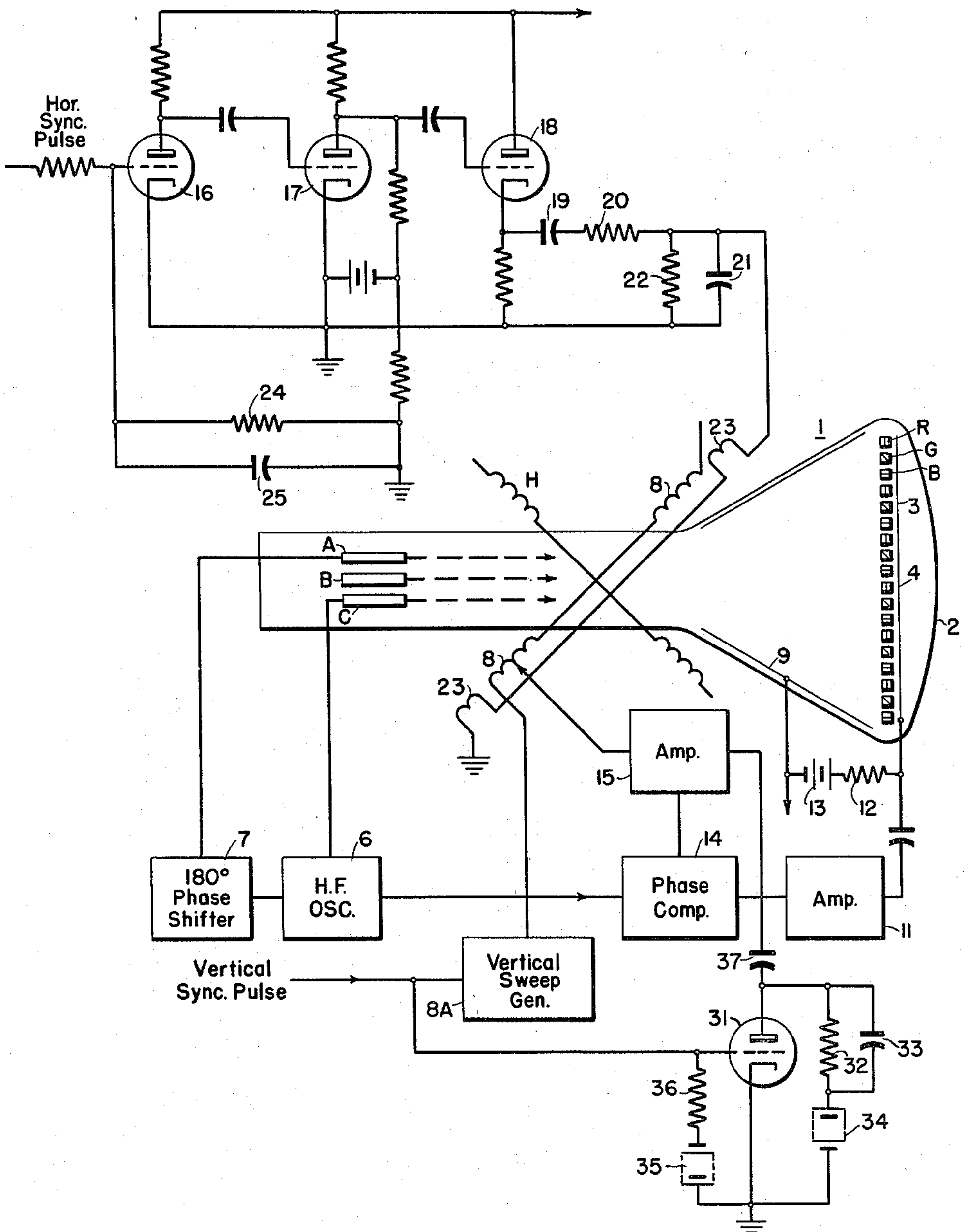
WITNESSES:
John E. Healy
Leon M. Garman
INVENTORS
Theadore Miller and
Kenneth N. Fromm.
BY
F. E. Browder
ATTORNEY

United States Patent Office 2,727,184
Patented Dec. 13, 1955

2,727,184

SERVO CONTROLLED TRI-COLOR TELEVISION TUBE

Theadore Miller, Los Angeles, Calif., and Kenneth N. Fromm, Fort Wayne, Ind., assignors to Westinghouse Electric Corporation, East Pittsburgh, Pa., a corporation of Pennsylvania Application October 9, 1952, Serial No. 313,972

10 Claims. (Cl. 315—12)

Our invention relates to color television systems and in particular relates to a picture-receiving tube having an output screen comprising parallel strips of phosphors fluorescing in primary colors which are respectively bombarded by three electron guns, and provided with means for correcting deviations of the bombarding beams from accurate incidence on the respective strips.

An object of our invention is to provide a new and improved type of color television system.

Another object is to provide a novel type of picture-receiving circuit for color television systems.

Another object is to provide a novel type of picture-receiving tube for color television systems.

Still another object is to provide a system for maintaining proper tracking of a multi-beam scanning device in a color-picture system with a multi-track picture-reproducing screen which shall keep each scanning beam in accurate registry with phosphor of the color it is intended to excite.

Yet another object is to provide such a system with novel means for keeping the scanning beams in accurate registry with the proper color lines on the phosphor screen in each of the two sets of interlaced frames which are employed in flicker-free television receivers.

Other objects of our invention will become apparent upon reading the following description taken in connection with the drawings in which the single figure is a schematic showing of a picture-receiving tube and control circuits therefor which embody the principles of our invention.

Referring in detail to the drawings, a kinescope 1 has a vacuum-tight container 2 of usual outline except that its neck is large enough to contain three electron guns A, B and C of form too well known to require detailed description. The opposite end of kinescope 1 encloses a glass screen 3 which has a transparent conductive coating 4 on which horizontal strips of fluorescent phosphors, subdivided into groups of three, are supported. The respective phosphors R, G and B of each group of three emit light of three primary colors, red, green and blue; and at least one of them, let us say G, differs from the others by being highly emissive of secondary electrons under electron bombardment.

A high frequency oscillator 6, preferably of a periodicity, such as 10 megacycles, which is well above any picture frequency likely to be present in a picture signal, impresses a low-percentage modulation on the electron gun which is trained on, let us say, a blue-emitting strip B, and also, through a phase-inverter 7, a modulation of reverse phase on one of the other electron-beams, let us say the one trained on a red-emitting phosphor strip R.

Vertical sweep coils 8 are supplied with saw-tooth current from a vertical sweep generator 8A so that the scanning-beams move gradually from the top to the bottom of the picture screen. The scanning beams from the three electron guns A, B and C are respectively focussed and trained on the strips R, G and B of each group, scanning a group simultaneously in the conventional horizontal direction, then moving down to and scanning the second group below that just scanned, and so on from top to bottom of the screen just as alternate lines are scanned to effect "interlaced scanning" in each frame on a black-and-white television screen. On the succeeding frame, the lines previously left unscanned are the ones covered.

Impact of the three electron beams A, B and C on the respective R, G and B phosphor strips on screen 3 will produce secondary electron emission from the latter, the emission excited by the unmodulated gun being, of course, readily distinguished from that due to either 10 megacycle-modulated electron gun. Similarly, the higher emissive power for secondary electrons of the green-emitting phosphors G will cause that color to produce a much stronger secondary-emission current than either of the other colored strips. The secondary emission may be picked up, for example, by the high-voltage anode 9 of the kinescope, and these secondary-electron currents may be fed to an amplifier 11 if the conductive coating 4 is connected to anode 9 through a suitable resistor 12 and voltage source 13. Thus, if the unmodulated gun B bombards the highly emissive strip G, the unmodulated current from the green strip G will predominate over the secondary-emission currents induced by the other two guns in amplifier 11; and it will be evident that gun B is trained on green-emitting strip G. On the other hand, a 10 megacycle modulation will be dominant in amplifier 11 should either gun A or gun C bombard strip G.

The outputs of amplifier 11 and oscillator 6 are fed to phase-comparator 14 which is arranged, in ways well known in the radio art, to have a zero output voltage when no 10 megacycle modulation is impressed on it by amplifier 11; to have a positive output voltage when the predominant modulation in amplifier 11 is induced by electron gun A; and a negative output voltage when the predominant modulation in amplifier 11 is induced by electron gun C. Thus, the polarity of the output voltage of phase comparator 14 shows whether gun A, B or C is trained on one of the highly-emissive green phosphor strips G.

The output voltage of the phase comparator 14 is fed through an amplifier 15 to the vertical deflecting coil 8 and the system adjusted so that electron gun B is centered on a green-emitting phosphor strip G. If now for any reason the beam from electron gun A shifts enough to strike any part of the green-emitting phosphor strip G, the 10 megacycle modulation on that gun beam will act through amplifier 11 to produce a positive output voltage on phase comparator 14, and this will alter the magnetic field of coil 8 to deflect the electron-beam system upward and remove the beam of electron gun A from incidence on any green phosphor strip G. If the beam from the electron gun C at any time strikes the green-emitting strip G, the phase comparator 14 will have a negative output voltage which will react through amplifier 15 to deflect the scanning beam system downward and prevent further aberration of the three-electron gun beams from the phosphor group on which they are then trained until the end of the horizontal line is reached.

The elements 12 through 15 thus constitute a servo system to hold the electron beams from guns A, B, C locked in accurate registry on any group of phosphor strips R, G, B on screen 4 which they have once started to scan.

The motion of the scanning beam to scan successive horizontal lines on the picture screen is produced by a horizontal deflection winding H fed with saw-tooth current from a so-called horizontal deflection generator (not shown). At the instant the scanning beam reaches the end of its horizontal path, the horizontal synchronizing pulse comes in to the receiver from the transmitter and triggers the horizontal saw-tooth generator to start the retrace movement of the scanning beam. During this retrace interval, the "blanking pulse" impressed on the electron guns reduces the intensity of the scanning beam so that the phosphors are not excited to luminescence, but the scanning beams are not completely cut off, and hence a small secondary-emission voltage is still impressed through resistor 12 and amplifier 11 on phase comparator 14. Any departure of the scanning beams from the phosphor strips on which they are then incident is prevented until the circuit network indicated in the drawing above the kinescope 1 impresses a voltage pulse in the channel furnishing magnetizing current to the vertical deflection coils of the kinescope 1 which suddenly drives the scanning beam to the phosphor group two lines below.

The vertical movement of the scanning beam which causes it to scan successive horizontal lines of the picture is produced by the circuit network shown above tube 1 in which the tubes 16 and 17 are connected to constitute a one-shot multivibrator that is triggered by the horizontal synchronizing pulse so that it acts during the horizontal retrace interval to impress a voltage pulse on the grid of cathode-follower amplifier 18. The latter sends a pulse of current via capacitor 19 and resistor 20 through auxiliary winding 23. This pulse is strong enough to displace the scanning beams emanating from electron guns A, B and C to the second group of phosphor strips R, G, B below the group which they have just been scanning. The steepness of the "rise-time" of this pulse is made so great that the servo system comprising elements 12 through 15 is unable to react quickly enough to prevent this displacement, and is similarly too slow to lock the scanning beams on the phosphor lines of the intermediate group of phosphor strips which they msut pass over to reach the second group below that which they have just finished scanning. The injected current pulse is made to be essentially saw-toothed and of sufficient duration to hold the scanning beams on the second lower phosphor group for a time long enough for the servo system to regain control. After that, the pulse dies away, leaving the servo system to hold the scanning beams in registry with the new phosphor group throughout the scansion and return-trace of that line until the next horizontal synchronizing pulse triggers multivibrator 16, 17 again.

To meet present practice and standards in the television industry, the pulse injected into auxiliary windings 23 might have a duration of about five microseconds and a rise-time of around one microsecond. The duration of this pulse is fixed in ways well known in the radio art by the values of the resistor 22 and capacitor 21 in the output circuit of amplifier 18.

It will usually be found preferable that the pulse impressed on auxiliary winding 23 shall occur near the middle of the retrace movement of the scanning beam. Hence, a delay may be interposed between the horizontal sync pulse which occurs, of course, at the initiation of the retrace movement, and the delivery of the pulse from multivibrator 16, 17 to that auxiliary winding. This delay is produced in ways well known in the art by a resistor 24 and capacitor 25 connected between ground and the control electrode of tube 16.

The scanning beams A, B and C are thus displaced in successive steps by the pulses injected into auxiliary winding 23, acting in conjunction with current sent through vertical sweep coils 8, until the foot of the screen is reached; and then the vertical synchronizing pulse, coming in from the transmitter, triggers the vertical sweep generator 8A to deflect the scanning beam upward to the top of the picture screen to start a new frame. To permit this and return the servo control comprising amplifier 15 to normal condition preparatory to scanning the new frame, the latter is disabled upon arrival of the vertical sync pulse by the network comprising an amplifier tube 31 having its anode supplied through a resistor 32 and capacitor 33 from a direct current source 34 having its negative terminal grounded and connected to the cathode of tube 31. The control electrode of tube 31 is biased below cut-off by a second direct current source 35 and resistor 36, and fed with the vertical sync pulse. The output of tube 31 is impressed through a blocking capacitor 37 on the first amplifier tube in amplifier 15.

The vertical sync pulse renders tube 31 conductive and thereby impresses a voltage which renders servo amplifier 15 inoperative for a long enough time to permit the current of vertical sweep generator 8A to move the scanning beams to the first line of the picture screen. Tube 31 then returns to its cut-off condition allowing the servo amplifier to control the vertical sweep coil 8 as described earlier herein until the vertical sync pulse indicating commencement of a new frame comes in from the transmitter. The resistor 32 and capacitor 33 fix the duration of the inoperative condition of amplifier 15 at the value of the vertical retrace time.

While we have described the multivibrator 16, 17 as responding to sync pulses coming into the receiver from the transmitter, it will be evident that since the horizontal retrace movement of the scanning beam results from a current variation in the sweep coils H which always follows each sync pulse, the triggering pulse impressed on the grid of tube 16 may alternatively be derived from that current variation. Similarly, the triggering pulse impressed on the grid of tube 31 may be derived from the current fluctuation in the vertical sweep coil instead of from the vertical sync pulse since the former always follows the latter.

We claim as our invention:

1. In a picture-receiving system in which a picture screen is traversed by a plurality of scanning beams in parallel paths, a picture screen having strips of fluorescent material to form said paths, said strips being divided into similar groups each of which groups has one strip of higher secondary electron emissivity than the other strips, and the scanning beams incident on said other strips having each a distinctive modulation in addition to video modulation, a first set of sweep elements moving said beam forward and backward in a direction parallel to said paths in response to a first set of sync signals, a second set of sweep elements deflecting said beam back and forth in a direction transverse to said paths in response to a second set of sync signals, means responsive to the presence of either of said distinctive modulations in said higher secondary electron emission to apply a correction to eliminate departure of said distinctively modulated beams from incidence on strips emitting other colors.

2. In a picture-receiving system in which a picture screen is traversed by a scanning beam in parallel paths interlacing successive frames, a picture screen having strips of fluorescent material to form said paths, a first set of sweep elements moving said beam forward and backward in a direction parallel to said paths in response to a first set of sync signals, a second set of sweep elements deflecting said beam back and forth in a direction transverse to said paths in response to a second set of sync signals, means responsive to departure of said beam from incidence on one of said strips to apply a correction to eliminate said departure during said forward movement, means responsive to said first set of sync signals to overcome said means responsive to departure and cause said beam to jump during said backward movement over the next path into incidence with a strip in the second path away from that it was scanning during said forward movement, and means responsive to said second set of sync signals to disable said means responsive to departure in the interval between successive frames.

3. In a picture-receiving system in which a picture screen is traversed by a scanning beam in parallel paths interlacing successive frames, a picture screen having strips of fluorescent material to form said paths, a first set of sweep elements moving said beam forward and backward in a direction parallel to said paths in response to a first set of sync signals, a second set of sweep elements deflecting said beam back and forth in a direction transverse to said paths, means responsive to departure of said beam from incidence on one of said strips to apply a correction to eliminate said departure during said forward movement and means responsive to said first set of sync signals to overcome said means responsive to departure and cause said beam to jump during said backward movement over the next path into incidence with a strip in the second path away from that it was scanning during said forward movement.

4. In a picture-receiving system in which is embodied a picture screen having groups of fluorescent strips respectively emitting different primary colors under impact of a scanning beam for each said path, the strips emitting one color having a substantially different secondary electron emissivity than those emitting other colors, an electronic scanning beam for each strip of a group, a first set of sweep elements moving said beams forward and backward in a direction parallel to said strips in response to a first set of sync signals, a second set of sweep elements deflecting said beam back and forth in a direction transverse to said strips, means to apply distinctive modulations to the beams directed to strike strips emitting said other colors, and means responsive to presence of either of said distinctive modulations in said different secondary emission to apply a correction to eliminate departure of said distinctively modulated beams from incidence on strips emitting other colors during said forward movement, and means responsive to said first set of sync signals to overcome said means responsive to presence of either of said distinctive modulations and cause said beams to jump during said backward movement into incidence with strips of a second group of strips.

5. In a picture-receiving system in which is embodied a picture screen having groups of fluorescent strips respectively emitting different primary colors under electron impact, the strips emitting one color having a substantially different secondary electron emissivity than those emitting other colors, an electronic scanning beam for each strip of a group, a first set of sweep elements moving said beams forward and backward in a direction parallel to said strips in response to a first set of sync signals, a second set of sweep elements deflecting said beams back and forth in a direction transverse to said strips in response to a second set of sync signals, means to apply distinctive modulations to the beams directed to strike strips emitting said other colors, and means responsive to presence of either of said distinctive modulations in said different secondary emission to apply a correction to eliminate departure of said distinctively modulated beams from incidence on strips emitting other colors during said forward movement, and means responsive to said first set of sync signals to overcome said means responsive to presence of either of said distinctive modulations and cause said beams to jump during said backward movement into incidence with strips of a second group of strips, and means responsive to said second set of sync signals to disable said means responsive to departure in the interval between successive frames.

6. In a picture-receiving system in which a picture screen is traversed by a scanning beam in parallel paths interlacing successive frames, a picture screen having a group of strips respectively emitting red, green, and blue light under impact of said beam for each said path, a first set of sweep elements moving said beam forward and backward in a direction parallel to said paths in response to a first set of sync signals, a second set of sweep elements deflecting said beam back and forth in a direction transverse to said paths in response to a second set of sync signals, means responsive to departure of said beam from incidence on one of said strips to apply a correction to eliminate said departure during said forward movement and means responsive to said first set of sync signals to overcome said means responsive to departure and cause said beam to jump during said backward movement over the next path into incidence with a strip in the second path away from that it was scanning during said forward movement.

7. In a picture-receiving system in which a picture screen is traversed by a scanning beam in parallel paths interlacing successive frames, a picture screen having a group of strips respectively emitting red, green, and blue light under impact of said beam for each said path, a first set of sweep elements moving said beam forward and backward in a direction parallel to said paths in response to a first set of sync signals, a second set of sweep elements deflecting said beam back and forth in a direction transverse to said paths in response to a second set of sync signals, means responsive to departure of said beam from incidence on one of said strips to apply a correction to eliminate said departure during said forward movement and means responsive to said first set of sync signals to overcome said means responsive to departure and cause said beam to jump during said backward movement over the next path into incidence with a strip in the second path away from that it was scanning during said forward movement, and means responsive to said second set of sync signals to disable said means responsive to departure in the interval between successive frames.

8. In a television picture receiver, a picture screen having parallel strips of fluorescent material, means for projecting a scanning beam toward said strips, a first set of sweep elements moving said beam forward and backward in a direction parallel to said strips, a second set of sweep elements moving said beam in a direction transverse to said strips, means responsive to departure of said beam from incidence on one of said strips to supply a current to said second set of sweep elements to eliminate said departure, and means for supplying a current synchronized with said backward movements to overcome the effect of said current in eliminating said departure.

9. An arrangement as set forth in claim 8 in which the last mentioned means comprises a pulse generator triggered in synchronism with said backward movements to energize said second set of sweep elements with a pulse strong enough to overcome the effect of said means responsive to departure.

10. An arrangement as set forth in claim 9 in which means are provided to disable said means responsive to departure during the intervals between picture frames.

References Cited in the file of this patent

UNITED STATES PATENTS

| | | |
|---|---|---|
| 2,458,291 | Munster et al. | Jan. 4, 1949 |
| 2,599,949 | Skellett | June 10, 1952 |
| 2,630,548 | Muller | Mar. 3, 1953 |
| 2,631,259 | Nicoll | Mar. 10, 1953 |
| 2,644,855 | Bradley | July 7, 1953 |
| 2,689,269 | Bradley | Sept. 14, 1954 |
| 2,689,926 | Bond | Sept. 21, 1954 |
| 2,689,927 | Bradley | Sept. 21, 1954 |

FOREIGN PATENTS

| | | |
|---|---|---|
| 866,065 | France | June 16, 1941 |